United States Patent
Moon et al.

(10) Patent No.: US 8,617,764 B2
(45) Date of Patent: Dec. 31, 2013

(54) ION CONDUCTIVE RESIN FIBER, ION CONDUCTIVE HYBRID MEMBRANE, MEMBRANE ELECTRODE ASSEMBLY AND FUEL CELL

(75) Inventors: Go-Young Moon, Daejeon (KR); Won-Ho Lee, Daejeon (KR); Sang-Hyun Lee, Namyangju-si (KR); Young-Il Choi, Cheongju-si (KR); Hyuk Kim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 409 days.

(21) Appl. No.: 12/994,435

(22) PCT Filed: May 28, 2009

(86) PCT No.: PCT/KR2009/002829
§ 371 (c)(1),
(2), (4) Date: Apr. 29, 2011

(87) PCT Pub. No.: WO2009/145570
PCT Pub. Date: Dec. 3, 2009

(65) Prior Publication Data
US 2011/0200907 A1  Aug. 18, 2011

(30) Foreign Application Priority Data
May 28, 2008 (KR) .................. 10-2008-0049822

(51) Int. Cl.
*H01M 8/10* (2006.01)
*H01M 8/02* (2006.01)
*H01M 8/04* (2006.01)

(52) U.S. Cl.
USPC ........... 429/492; 429/493; 429/494; 429/455; 429/480; 521/29; 521/28

(58) Field of Classification Search
None
See application file for complete search history.

(56) References Cited

U.S. PATENT DOCUMENTS

| | | | | |
|---|---|---|---|---|
| 3,489,699 A | * | 1/1970 | Battaerd et al. | ................. 521/28 |
| 2006/0263659 A1 | * | 11/2006 | Cho et al. | ........................ 429/30 |
| 2007/0128425 A1 | | 6/2007 | Romdhane et al. | |
| 2007/0287051 A1 | | 12/2007 | Onuma et al. | |

FOREIGN PATENT DOCUMENTS

| | | | | |
|---|---|---|---|---|
| JP | 2002-231269 | | 8/2002 | |
| JP | 2002-231270 | | 8/2002 | |
| JP | 2002-352819 | | 12/2002 | |
| JP | 2003132910 A | * | 5/2003 | ............. H01M 8/02 |
| WO | 97/41168 A1 | | 11/1997 | |

* cited by examiner

*Primary Examiner* — Edu E Enin-Okut
(74) *Attorney, Agent, or Firm* — McKenna, Long & Aldridge, LLP (57) ABSTRACT

Provided are an ion conductive resin fiber, an ion conductive hybrid membrane, a membrane electrode assembly and a fuel cell. The ion conductive resin fiber comprises an inner layer including an ion conductive resin; and an outer layer including an ion conductive resin having larger EW than the ion conductive resin of the inner layer, and surrounding the inner layer. The ion conductive resin fiber and the ion conductive hybrid membrane are excellent in ion conductivity, polar solvent stability and dimensional stability under low humidity conditions. The fuel cell manufactured using the same has advantages of stable operation and management of a system at ease, removal or reduction of components related to water management, and even in case of low relative humidity, operation at high temperature of 80° C. or higher.

16 Claims, 5 Drawing Sheets

ION CONDUCTIVE RESIN FIBER, ION CONDUCTIVE HYBRID MEMBRANE, MEMBRANE ELECTRODE ASSEMBLY AND FUEL CELL

This application is a National Stage Application of PCT/KR2009/002829, filed on May 28, 2009, which claims the benefit of Korean Patent Application No. 10-2008-0049822, filed May 28, 2008, each of which are hereby incorporated by reference for all purposes as if fully set forth herein in their entireties.

TECHNICAL FIELD

The present invention relates to an ion conductive resin fiber, an ion conductive hybrid membrane, a membrane electrode assembly and a fuel cell, and more particularly, to an ion conductive resin fiber that is excellent in ion conductivity, solvent stability and dimensional stability, and an ion conductive hybrid membrane, a membrane electrode assembly and a fuel cell comprising the same.

BACKGROUND ART

Recently, it is expected that conventional energy sources such as oil or charcoal will be exhausted, and thus interests in alternative energy are increasing. As one of the alternative energy, a fuel cell has high efficiency, does not emit a pollutional material such as $NO_x$ or $SO_x$, and is supplied with an abundant fuel, and thus it is the center of attention.

The fuel cell is an electrical power system for converting a chemical reaction energy of a fuel and an oxidant into an electrical energy. Typically, hydrocarbon such as hydrogen, methanol or butane is used as a fuel, and oxygen is used as an oxidant.

The fuel cell includes a polymer electrolyte membrane fuel cell (PEMFC), a direct methanol fuel cell (DMFC), a phosphoric acid fuel cell (PAFC), an alkaline fuel cell (AFC), a molten carbonate fuel cell (MCFC), a solid oxide fuel cell (SOFC) and so on. Among them, the PEMFC has good energy density and high output, and thus its research and development is made briskly. The PEMFC is different from the other fuel cells in that a solid polymer electrolyte membrane is used, but not a liquid electrolyte.

For commercialization, the essential considerations of the PEMFC are currently performance improvement, life prolongation and competitive price. These three factors are affected most by a membrane electrode assembly (MEA), and the present invention relates to the MEA, in particular, an ion exchange membrane of the MEA.

In operation of a fuel cell, effective management of water is one of the most important factors that affect the performance of the fuel cell. In practice, a wet fuel is fed into a fuel cell to prevent dryness of the membrane electrode assembly. Water generated at a cathode should be promptly removed not to obstruct the fuel supply.

Note that water is important particularly in the membrane electrode assembly. When water supply is insufficient, an ion exchange membrane has a sudden reduction in conductivity of hydrogen ions. Consequently, performance of the membrane electrode assembly deteriorates in a short period, and in a long period, partial or total deterioration of the ion exchange membrane is promoted to create a pinhole of the membrane, which results in expiration of the life of the membrane electrode assembly. Therefore, to maximize the performance and life of the membrane electrode assembly, the ion exchange membrane should be supplied/maintained with the required optimum water.

Meanwhile, an excessive amount of water results in dissolution of a catalyst, oxidation acceleration of a gas diffusion layer of a membrane electrode assembly, deterioration of operational stability, or enlargement or addition of external devices for humidifying. Therefore, it requires an ion exchange membrane capable of ensuring sufficient ion conductivity at low RH of 50% or lower. Such a low humidity ion exchange membrane needs a small amount of absolute water, and thus, has advantages of stable operation and management of a system at ease, removal or reduction of components related to water management, and even in case of low relative humidity, operation at high temperature of 80° C. or higher.

Conventionally, in the case of a perfluorosulfonic acid membrane that is a fluoride-based ion exchange membrane, attempts have been made to lower EW (Equivalent Weight) indicating an amount of $SO_3H$ group that performs a hydrogen ion conducting function, i.e. to increase ion conductivity, thereby leading to high ion conductivity at a given relative humidity. In the case of a hydrocarbon-based ion exchange membrane that is used in place of the fluoride-based ion exchange membrane, it is known that the hydrocarbon-based ion exchange membrane should have lower EW than the fluoride-based ion exchange membrane to obtain the same ion conductivity as the fluoride-based ion exchange membrane.

In other words, high ion conductivity results in low EW, which means a large amount of hydrogen ion conducting $SO_3H$ group per unit gram of an ion exchange membrane.

However, as an amount of $SO_3H$ group increases, polar solvent (water or alcohols) stability of an ion exchange membrane falls down rapidly, dimensional stability fails under wet operating conditions of a fuel cell, and finally the membrane dissolves. To solve the problem, the present invention provides a configuration to ensure mechanical and chemical stability using an ion exchange membrane made from an ion conductive material having a maximum amount of $SO_3H$ for maximum ion conductivity.

DISCLOSURE

Technical Problem

The present invention is designed to solve the problems of the prior art, and therefore it is an object of the invention to provide an ion conductive resin fiber that is excellent in ion conductivity, polar solvent stability and dimensional stability under low humidity conditions.

It is another object of the invention to provide an ion conductive hybrid membrane for a fuel cell, produced using the ion conductive resin fiber.

It is still another object of the invention to provide a membrane electrode assembly for a fuel cell, comprising the ion conductive resin fiber.

Technical Solution

In order to accomplish the object, the present invention provides an ion conductive resin fiber comprising an inner layer including an ion conductive resin; and an outer layer including an ion conductive resin having larger EW than the ion conductive resin of the inner layer, and surrounding the inner layer.

Typically, in the ion conductive resin fiber, the inner layer may include a polymer containing a sulfonic acid, the polymer being selected from the group consisting of poly(arylene ether sulfone), poly(arylene ether ketone), poly(arylene ether imide), nylon, cellulose acetate and cellulose triacetate, however the present invention is not limited in this regard. The outer layer may include the above-mentioned ion conductive resins used in the inner layer. The inner layer and the outer layer may include the same polymer resin or different polymer resins.

Preferably, the ion conductive resin of the inner layer has EW of 600 to 1000, and the ion conductive resin of the outer layer EW of 601 to 1100.

Preferably, in the above-mentioned ion conductive resin fibers, the inner layer has diameter of 50 nm to 300 μm, and the outer layer has thickness of 100 nm to 300 μm.

Preferably, in the above-mentioned ion conductive resin fibers, the inner layer further includes a hydrophilic inorganic material selected from the group consisting of silica, titanium oxide, zirconium oxide and phosphotungstic acid. The hydrophilic inorganic nanoparticles have excellent moisture retention, and thus, retain water under low humidity conditions or when humidity conditions change, resulting in easy conduction of hydrogen ions. The ion conductive resin fibers may be typically fabricated by electrospinning.

The present invention also provides an ion conductive hybrid membrane including a porous mat made from at least one of the above-mentioned ion conductive resin fibers, and a non-ion conductive polymer resin impregnating into the porous mat and selected from the group consisting of polytetrafluoroethylene and polyvinylidenefluoride, and mixtures thereof.

To improve ion conductivity, the ion conductive hybrid membrane may further include an ion conductive polymer resin impregnating into the porous mat and selected from the group consisting of perfluorosulfonic acid polymer, hydrocarbon-based polymer, polyimide, polyethersulfone, polyphenylenesulfide, polyphenyleneoxide, polyphosphazene, polyethylenenaphthalate, polyester, doped polybenzimidazole, polyetherketone, polysulfone, and acids and bases thereof.

And, the present invention provides a membrane electrode assembly for a fuel cell, including the above-mentioned ion conductive hybrid membrane, and an anode and a cathode located at the opposite side of the ion conductive hybrid membrane, wherein each of the anode and the cathode has a gas diffusion layer and a catalyst layer.

Further, the present invention provides a fuel cell comprising a stack comprising (i) at least one membrane electrode assembly, in case the stack comprises at least two assemblies, (ii) at least one separator interposed between at least one pair of adjacent membrane electrode assemblies, a fuel supply unit for supplying a fuel to the stack and an oxidant supply unit for supplying an oxidant to the stack.

DESCRIPTION OF DRAWINGS

These and other features, aspects, and advantages of preferred embodiments of the present invention will be more fully described in the following detailed description, taken accompanying drawings.

MODE FOR INVENTION

Hereinafter, the present invention will be described in detail with reference to the accompanying drawings. Prior to the description, it should be understood that the terms used in the specification and appended claims should not be construed as limited to general and dictionary meanings, but interpreted based on the meanings and concepts corresponding to technical aspects of the present invention on the basis of the principle that the inventor is allowed to define terms appropriately for the best explanation.

Therefore, the description proposed herein is just a preferable example for the purpose of illustrations only, not intended to limit the scope of the invention, so it should be understood that other equivalents and modifications could be made thereto without departing from the spirit and scope of the invention.

Figure 1:
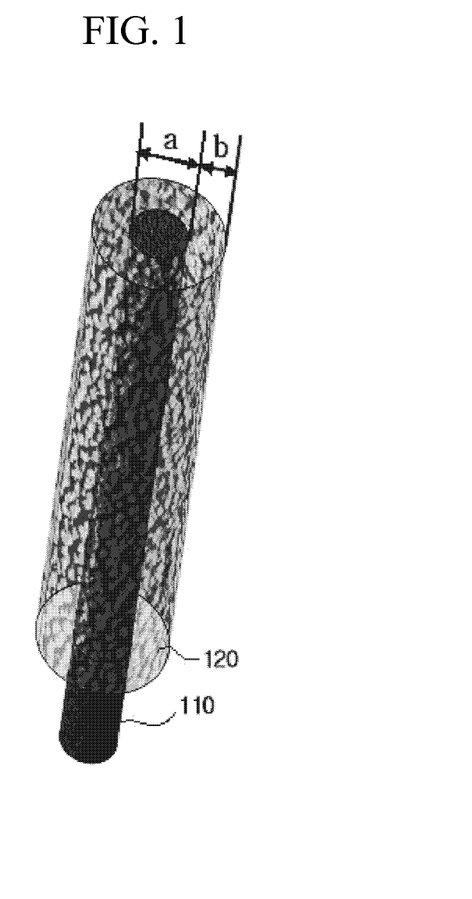
FIG. 1 is a schematic view of an ion conductive resin fiber according to an embodiment of the present invention.

An ion conductive resin fiber of the present invention is used in manufacturing a porous mat that constitutes an ion conductive hybrid membrane for a fuel cell. As shown in FIG. 1, the ion conductive resin fiber has a core-shell structure including an inner layer 110 and an outer layer 120. That is, the inner layer 110 includes a polymer resin with high ion conductivity, and the outer layer 120 includes a polymer resin with excellent dimensional stability and solvent stability. Thus, the ion conductive resin fiber is excellent in ion conductivity, polar solvent stability and dimensional stability.

In the ion conductive polymer resin, as EW (Equivalent Weight) becomes smaller, ion conductivity increases, but polar solvent stability and dimensional stability decreases. On the contrary, as EW becomes larger, ion conductivity decreases, but polar solvent stability and dimensional stability increases. Here, EW indicates an amount of $SO_3H$ group that performs an ion conducting function.

Thus, the present invention focuses on the correlation between EW and ion conductivity, solvent stability and so on, and provides an ion conductive resin fiber comprising an inner layer including an ion conductive resin and an outer layer including an ion conductive resin, wherein the ion conductive resin of the inner layer has lower EW than the ion conductive resin of the outer layer. The inner layer and the outer layer can use different types of polymer resins or the same type of polymer resin having different EWs.

In the ion conductive resin fiber, the inner layer may be typically a polymer containing a sulfonic acid, such as poly(arylene ether sulfone), poly(arylene ether ketone), poly(arylene ether imide), nylon, cellulose acetate or cellulose triacetate, however the present invention is not limited in this regard. The outer layer may use the above-mentioned ion conductive resins. The inner layer and the outer layer may use the same polymer resin or different resins.

When the ion conductive resins used in the inner layer and the outer layer have EWs of 600 to 1000 and 601 to 1100, respectively, ion conductivity can be maintained better and a proper amount of sulfonic acid for optimum dimensional stability can be obtained.

In the ion conductive resin fiber, diameters of the inner layer and the outer layer are not limited to specific ranges. However, in consideration of ion conductivity and stability of the ion conductive resin fiber, preferably the inner layer has diameter (a) of 50 nm to 300 μm and the outer layer has thickness (b) of 100 nm to 300 µm. And, as shown in FIG. 1, the inner layer and/or the outer layer may have a circular cross section, however the cross section of the inner layer and/or the outer layer may have an angular shape with a predetermined number of corners, for example, a triangle, a square or a star-like shape.

And, to further improve ion conductivity, the inner layer of the ion conductive resin fiber may preferably include a hydrophilic inorganic material selected from the group consisting of silica, titanium oxide, zirconium oxide and phosphotungstic acid.

Figure 2:
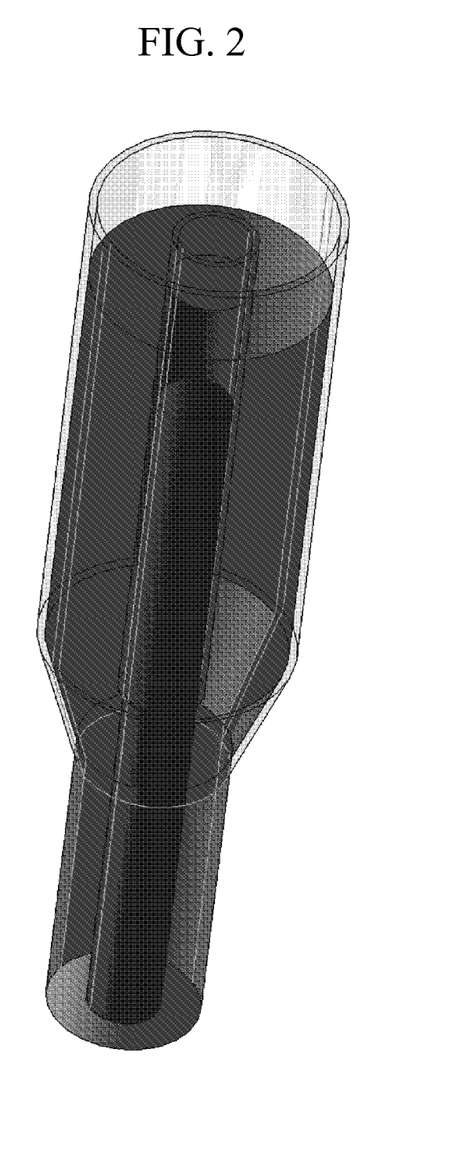
FIG. 2 is a schematic view of an example of a die for fabricating an ion conductive resin fiber of double cylindrical structure by electrospinning.

As mentioned above, the ion conductive resin fiber may be typically fabricated by electrospinning, however the present invention is not limited in this regard. For example, the ion conductive resin fiber may be also fabricated by conventional methods including, but not limited to, spinning, drawing, phase separation, template synthesis or self assembly. FIG. 2 is a schematic view of an example of a die for fabricating an ion conductive resin fiber of double cylindrical structure by electrospinning.

The present invention also provides an ion conductive hybrid membrane including a porous mat, and a non-ion conductive polymer resin. The porous mat is made from at least one of the exemplary ion conductive resin fibers of the present invention, and is impregnated with the non-ion conductive polymer resin. The non-ion conductive polymer resin is selected from the group consisting of polytetrafluoroethylene and polyvinylidenefluoride, and mixtures thereof. The ion conductive hybrid membrane can act as an electrolyte membrane for moving hydrogen ions produced at an anode to a cathode in a membrane electrode assembly of a fuel cell.

As mentioned above, the porous mat is impregnated with polytetrafluoroethylene and polyvinylidenefluoride that are non-ion conductive fluoride-based materials, to improve the mechanical strength and electrochemical stability of the ion conductive hybrid membrane.

To further improve the ion conductivity, the ion conductive hybrid membrane may further include an ion conductive polymer resin, with which the porous mat is impregnated. Typically, the ion conductive polymer resin includes perfluorosulfonic acid polymer, hydrocarbon-based polymer, polyimide, polyethersulfone, polyphenylenesulfide, polyphenyleneoxide, polyphosphazene, polyethylenenaphthalate, polyester, doped polybenzimidazole, polyetherketone, polysulfone, and acids and bases thereof.

Figure 3:
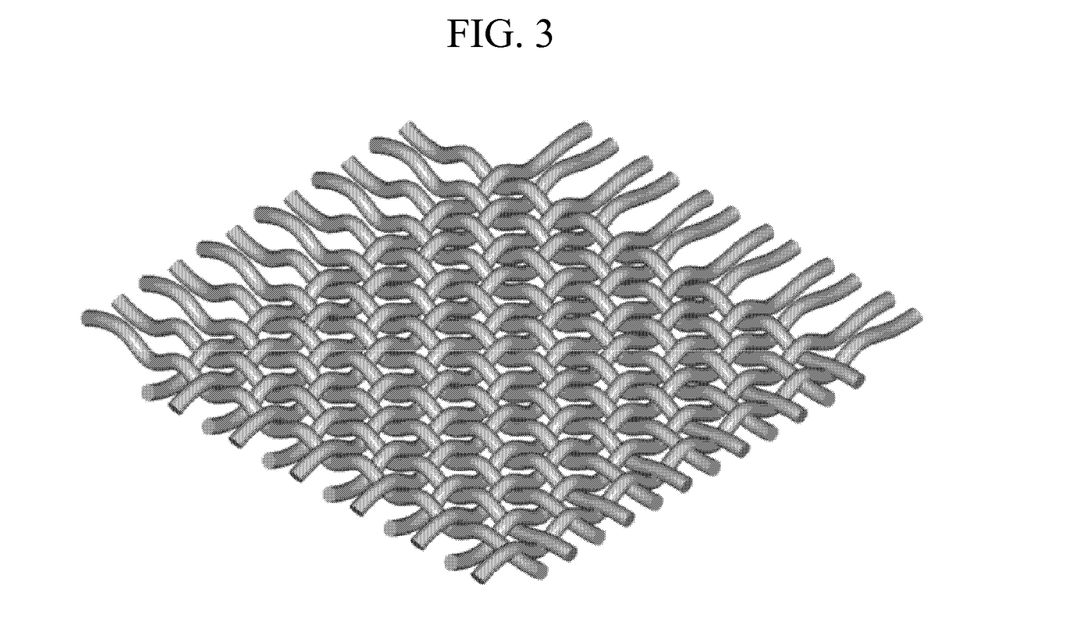
FIGS. 3 and 4 are schematic views of porous mats according to an embodiment of the present invention.
Figure 4:
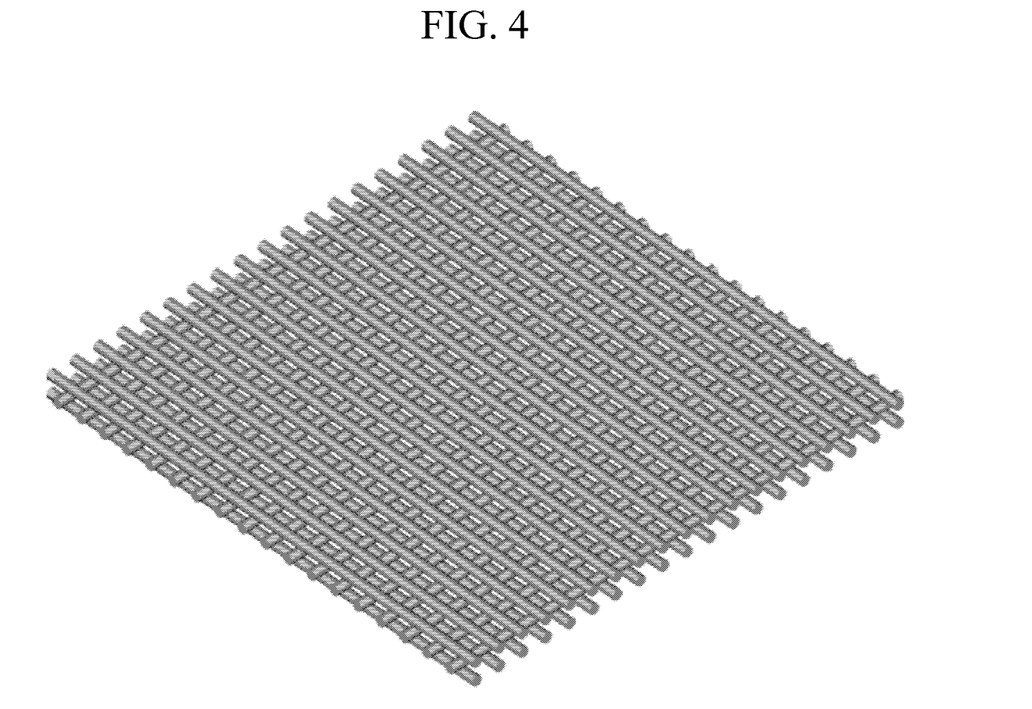

The porous mat may be manufactured in various shapes including shapes shown in FIGS. 3 and 4. A method for manufacturing the porous mat is not limited to a specific method if it manufactures a mat from fiber. For example, as shown in FIGS. 3 and 4, the porous mat may be manufactured by, for example, weaving or knitting with fiber in a predetermined pattern. Alternatively, the porous mat may be manufactured in the type of a nonwoven fabric.

Preferably, the porous mat has porosity of 30 to 90%. If porosity is more than 90%, it is not preferable because the porous mat can not serve as a porous substrate that provides mechanical strength. If porosity is less than 30%, it is not preferable because ion conducting channels of hydrogen ions are insufficient, and consequently, a sufficiency of hydrogen ions do not move. And, to reduce ion conductive resistance, the porous mat preferably has small thickness, for example, 10 to 50 µm.

Optionally, in the case of the porous mat formed by electrospinning, a solvent evaporates during electrospinning and fibers are bonded by physical overlapping, so that the porous mat has low mechanical strength. To improve the mechanical strength and dimensional stability, contact areas between fibers may be welded by exposing the porous mat to a solvent vapor. At this time, the solvent typically includes dimethylformamide (DMF), dimethylsulfoxide (DMSO) and N-methylpyrrolidone (NMP), however the present invention is not limited in this regard.

Figure 5:
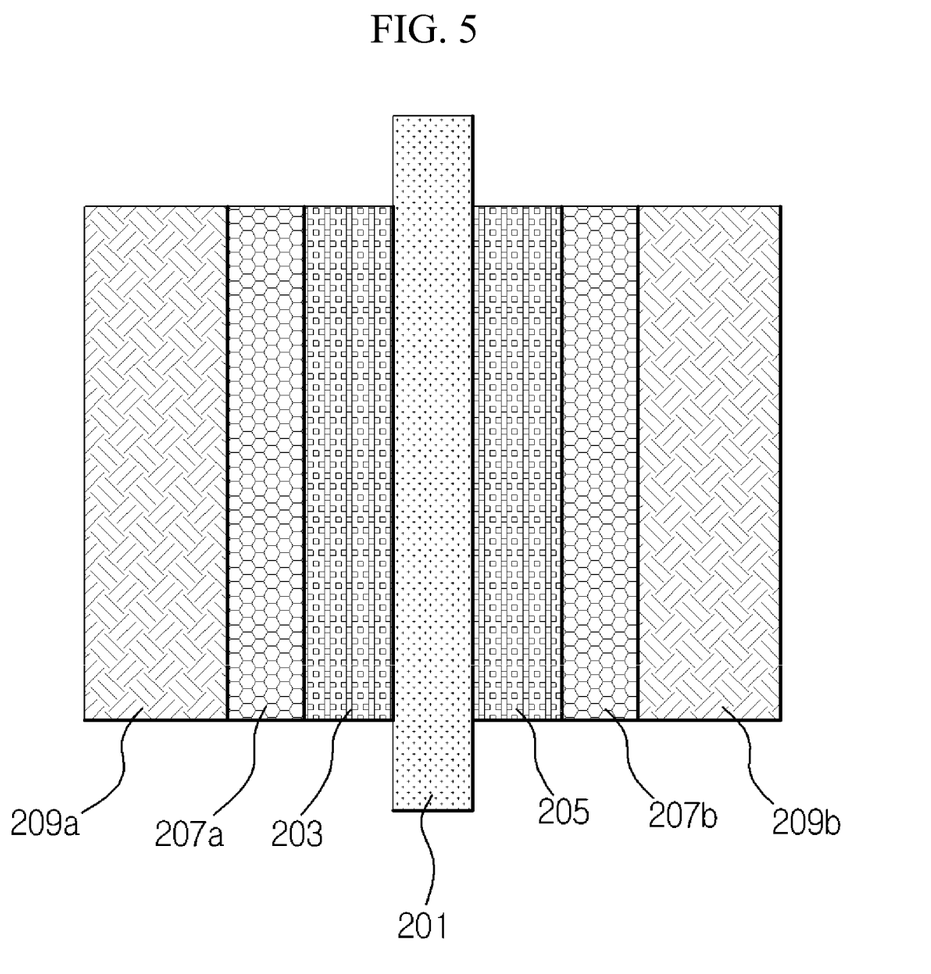
FIG. 5 is a cross-sectional view of a membrane electrode assembly according to an embodiment of the present invention.

The membrane electrode assembly of the present invention includes the above-mentioned ion conductive hybrid membrane. FIG. 5 is a cross-sectional view of a membrane electrode assembly according to an embodiment of the present invention. Referring to FIG. 5, the membrane electrode assembly of the present invention includes the above-mentioned ion conductive hybrid membrane 201, and an anode 203, 207a and 209a and a cathode 205, 207b and 209b located at the opposite side of the ion conductive hybrid membrane 201. The anode 203, 207a and 209a includes a catalyst layer 203 and gas diffusion layers 207a and 209a, and the cathode 205, 207b and 209b includes a catalyst layer 205 and gas diffusion layers 207b and 209b.

Preferably, in the catalyst layer 203 of the anode where an oxidation reaction of a fuel occurs, a catalyst may be selected from the group consisting of platinum, ruthenium, osmium, platinum-ruthenium alloy, platinum-osmium alloy, platinum-palladium alloy and platinum-transition metal alloy. And, in the catalyst layer 205 of the cathode where a reduction reaction of an oxidant occurs, a catalyst may be platinum or platinum-transition metal alloy. The catalysts may be used by themselves or be supported by a carbon-based carrier.

A process for introducing the catalyst layers 203 and 205 may be performed by a typical method known in the art. For example, the catalyst layers 203 and 205 may be formed by directly coating a catalyst ink on the ion conductive electrolyte membrane 201 or coating a catalyst ink on the gas diffusion layers 207a, 207b and 209a, 209b, respectively. At this time, a method for coating the catalyst ink is not limited to a specific method, however the method may be spray coating, tape casting, screen printing, blade coating, die coating or spin coating. Typically, the catalyst ink may include a catalyst, a polymer ionomer and a solvent.

The gas diffusion layers 207a, 207b and 209a, 209b act as a current conductor and flow channels of a reaction gas and water, and have a porous structure. Thus, the gas diffusion layers 207a, 207b and 209a, 209b include conductive substrates 209a and 209b, respectively. Preferably, the conductive substrates 209a and 209b may be made from a carbon paper, a carbon cloth or a carbon felt. The gas diffusion layers 207a, 207b and 209a, 209b include microporous layers 207a and 207b between the catalyst layers 203 and 205 and the conductive substrates 209a and 209b, respectively. The microporous layers 207a and 207b are configured to improve the performance of a fuel cell under low humidity conditions, and to reduce an amount of water flowing out of the gas diffusion layers 207a, 207b and 209a, 209b so that the ion conductive electrolyte membrane 201 is in a sufficient wet state.

The above-mentioned ion conductive hybrid membrane and membrane electrode assembly can be applied to a polymer electrolyte membrane fuel cell using a solid electrolyte membrane and a direct liquid fuel cell. Typically, the direct liquid fuel cell includes a direct methanol fuel cell using methanol as a fuel.

Figure 6:
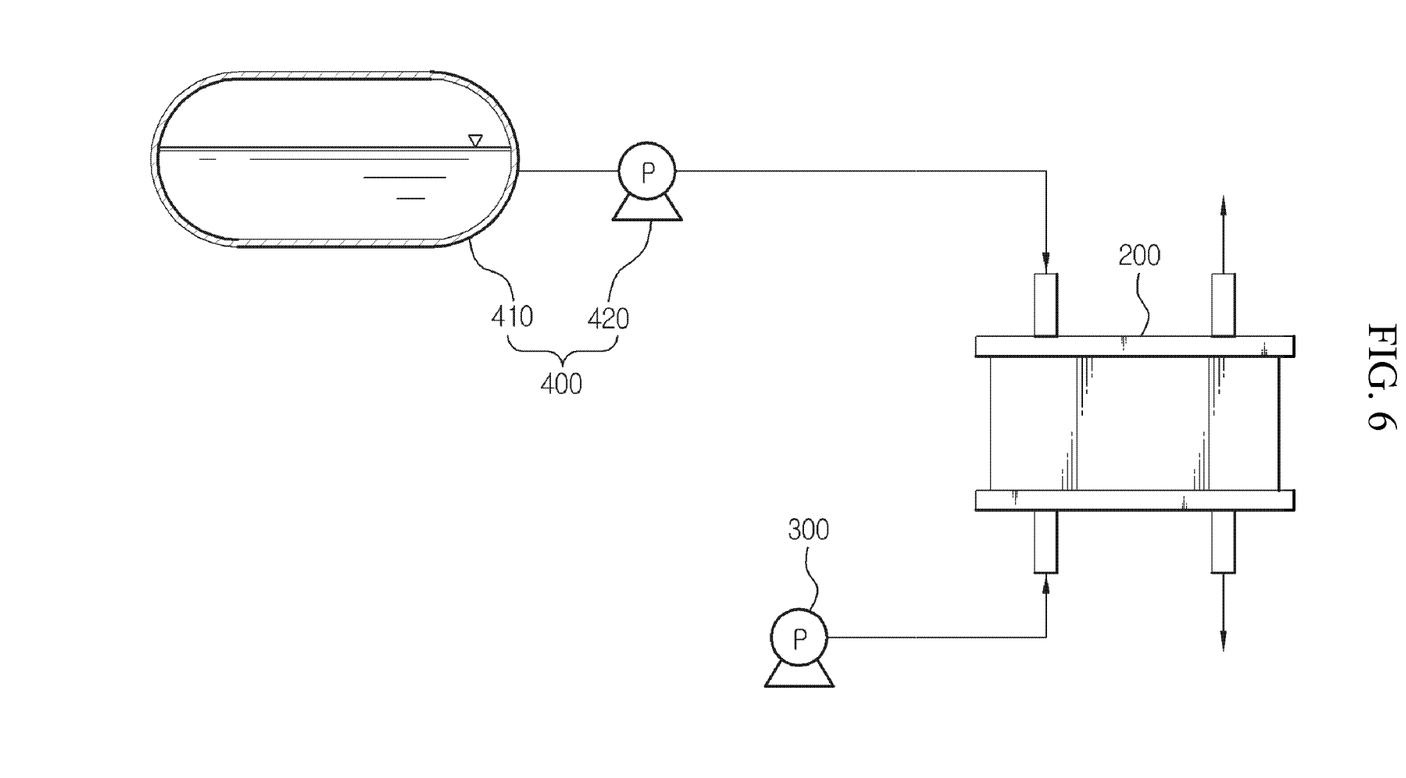
FIG. 6 is a schematic view of a fuel cell according to an embodiment of the present invention.

The present invention also provides a fuel cell including the membrane electrode assembly of the present invention. FIG. 6 is a schematic view of a fuel cell according to an embodiment of the present invention. Referring to FIG. 6, the fuel cell of the present invention includes a stack 200, a fuel supply unit 400 and an oxidant supply unit 300.

The stack 200 includes at least one membrane electrode assembly of the present invention. In the case of two or more membrane electrode assemblies, the stack 200 includes at least one separator interposed between the membrane electrode assemblies. The separator is configured to block an electrical connection of the membrane electrode assemblies, to transmit a fuel and an oxidant from an external source to the membrane electrode assemblies, and to connect an anode and a cathode in series.

The fuel supply unit 400 is configured to supply a fuel to the stack 200, and includes a fuel tank 410 for storing the fuel and a pump 420 for supplying the fuel stored in the fuel tank 410 to the stack 200. The fuel may be a hydrogen or hydrocarbon fuel of gas or liquid state. For example, the hydrocarbon fuel may be methanol, ethanol, propanol, butanol or natural gas.

The oxidant supply unit 300 is configured to supply an oxidant to the stack 200. Typically, oxygen is used as the oxidant. Oxygen or air is used by injection of the pump 300.

Hereinafter, the preferred embodiments of the present invention are described in detail. However, it should be understood that the detailed description and specific examples, while indicating preferred embodiments of the invention, are given by way of illustration only, since various changes and modifications within the spirit and scope of the invention will become apparent to those skilled in the art from this detailed description.

Embodiment 10 weight % of silica was added to a polyarylene ether sulfone resin solution having 800 EW to prepare a polymer solution. And, a polymer solution of a polyarylene ether ketone resin having 1000 EW was prepared. Ion conductive resin fibers were fabricated through an electrospinner having a die of FIG. 2 (diameter of inner layer: 0.5 µm, thickness of outer layer: 0.5 µm).

As shown in FIG. 3, the ion conductive resin fibers were arranged to form a porous mat, which was exposed to dimethylformamide vapor. Then, the porous mat was impregnated with polytetrafluoroethylene and subsequently with polyethersulfone to produce an ion conductive hybrid membrane.

A polymer electrolyte membrane fuel cell was manufactured using the ion conductive hybrid membrane by a typical method.

INDUSTRIAL APPLICABILITY

According to the present invention, the ion conductive resin fiber and ion conductive hybrid membrane are excellent in ion conductivity, polar solvent stability and dimensional stability under low humidity conditions. Accordingly, a fuel cell manufactured using the same has advantages of stable operation and management of a system at ease, removal or reduction of components related to water management, and even in case of low relative humidity, operation at high temperature of 80° C. or higher.

What is claimed is:

1. An ion conductive resin fiber, comprising:
an inner layer comprising an ion conductive resin; and
an outer layer comprising an ion conductive resin having larger EW (Equivalent Weight) than the ion conductive resin of the inner layer, and surrounding the inner layer.

2. The ion conductive resin fiber according to claim 1, wherein the ion conductive resin of the inner layer is a polymer containing a sulfonic acid, the polymer being selected from the group consisting of poly(arylene ether sulfone), poly(arylene ether ketone), poly(arylene ether imide), nylon, cellulose acetate and cellulose triacetate.

3. The ion conductive resin fiber according to claim 1, wherein the ion conductive resin of the outer layer is a polymer containing a sulfonic acid, the polymer being selected from the group consisting of poly(arylene ether sulfone), poly(arylene ether ketone), poly(arylene ether imide), nylon, cellulose acetate and cellulose triacetate.

4. The ion conductive resin fiber according to claim 1, wherein the ion conductive resin of the inner layer has EW of 600 to 1000, and the ion conductive resin of the outer layer EW of 601 to 1100.

5. The ion conductive resin fiber according to claim 1, wherein the inner layer has diameter of 50 nm to 300 µm.

6. The ion conductive resin fiber according to claim 1, wherein the outer layer has thickness of 100 nm to 300 µm.

7. The ion conductive resin fiber according to claim 1, wherein each of the inner layer and the outer layer has a circular or angular cross section.

8. The ion conductive resin fiber according to claim 1, wherein the inner layer further comprises a hydrophilic inorganic material selected from the group consisting of silica, titanium oxide, zirconium oxide and phosphotungstic acid.

9. An ion conductive hybrid membrane, comprising:
a porous mat made from the ion conductive resin fiber defined in claim 1;
a non-ion conductive polymer resin impregnating into the porous mat and selected from the group consisting of polytetrafluoroethylene and polyvinylidenefluoride, and mixtures thereof.

10. An ion conductive hybrid membrane, comprising:
a porous mat made from the ion conductive resin fiber defined in claim 1;
a non-ion conductive polymer resin impregnating into the porous mat and selected from the group consisting of polytetrafluoroethylene and polyvinylidenefluoride, and mixtures thereof; and
an ion conductive polymer resin impregnating into the porous mat and selected from the group consisting of perfluorosulfonic acid polymer, hydrocarbon-based polymer, polyimide, polyethersulfone, polyphenylenesulfide, polyphenyleneoxide, polyphosphazene, polyethylenenaphthalate, polyester, doped polybenzimidazole, polyetherketone, polysulfone, and acids and bases thereof.

11. The ion conductive hybrid membrane according to claim 9, wherein the porous mat has porosity of 50 to 90%.

12. A membrane electrode assembly for a fuel cell, comprising:
an ion conductive hybrid membrane defined in claim 9; and
an anode and a cathode located at the opposite side of the ion conductive hybrid membrane,
wherein each of the anode and the cathode has a gas diffusion layer and a catalyst layer.

13. A fuel cell, comprising:
a stack comprising:
at least one membrane electrode assembly defined in claim 12, and
in case the stack comprises at least two assemblies, at least one separator interposed between at least one pair of adjacent membrane electrode assemblies;
a fuel supply unit for supplying a fuel to the stack; and
an oxidant supply unit for supplying an oxidant to the stack.

14. The ion conductive hybrid membrane according to claim 10, wherein the porous mat has porosity of 50 to 90%.

15. A membrane electrode assembly for a fuel cell, comprising:
an ion conductive hybrid membrane defined in claim 10; and
an anode and a cathode located at the opposite side of the ion conductive hybrid membrane,
wherein each of the anode and the cathode has a gas diffusion layer and a catalyst layer.

16. A fuel cell, comprising:
a stack comprising:
at least one membrane electrode assembly defined in claim 15, and
in case the stack comprises at least two assemblies, at least one separator interposed between at least one pair of adjacent membrane electrode assemblies;
a fuel supply unit for supplying a fuel to the stack; and
an oxidant supply unit for supplying an oxidant to the stack.

* * * * *